United States Patent [19]
Ohzu et al.

[11] Patent Number: 5,256,498
[45] Date of Patent: Oct. 26, 1993

[54] MOLTEN CARBONATE FUEL CELL

[75] Inventors: Hideyuki Ohzu, Yokohama; Yoshihiro Akasaka, Sagamihara; Kazuaki Nakagawa, Urayasu; Hiroshi Tateishi, Zushi, all of Japan

[73] Assignee: Kabushiki Kaisha Toshiba, Kawasaki, Japan

[21] Appl. No.: 865,239

[22] Filed: Apr. 8, 1992

[30] Foreign Application Priority Data

Apr. 8, 1991 [JP] Japan .................. 3-073452
Jun. 10, 1991 [JP] Japan .................. 3-137768
Jan. 28, 1992 [JP] Japan .................. 4-013059

[51] Int. Cl.⁵ .................. H01M 8/14; H01M 4/86
[52] U.S. Cl. .................. 429/16; 429/41; 429/46
[58] Field of Search .................. 429/16, 41, 46

[56] References Cited

U.S. PATENT DOCUMENTS

| | | | |
|---|---|---|---|
| 4,247,604 | 1/1981 | Marianowski et al. | 429/46 X |
| 4,643,954 | 2/1987 | Smith | 429/16 X |
| 4,659,635 | 4/1987 | Reiser et al. | 429/46 X |
| 4,895,774 | 1/1990 | Ohzu et al. | 429/16 X |

FOREIGN PATENT DOCUMENTS

0170861 7/1988 Japan.

Primary Examiner—John S. Maples
Attorney, Agent, or Firm—Oblon, Spivak, McClelland, Maier & Neustadt

[57] ABSTRACT

A long-life molten carbonate fuel cell in which outflow of an electrolyte in an electrolyte body sandwiched between a pair of electrodes is reduced to suppress an increase in internal pressure of the electrolyte body and generation of a gas crossover which are caused by the outflow of the electrolyte is disclosed. The molten carbonate fuel cell includes a pair of conductive electrodes, an electrolyte body sandwiched between the pair of electrodes and constituted by a porous body containing as a filler at least two heterogeneous particles selected from the group consisting of $LiAl_xO_y$ ($4.5 \leq x \leq 5.5$ and $7.25 \leq y \leq 8.75$), $LiAl_aO_b$ ($0.89 \leq a \leq 1.11$ and $1.80 \leq b \leq 2.20$), lithium zirconate, and stabilized zirconia, and an electrolyte consisting of an alkali carbonate mixture impregnated in the porous body, fuel gas supplying member for supplying a fuel gas to one of the pair of electrodes, and an oxidant gas supplying member for supplying an oxidant gas to the other of the pair of electrodes.

15 Claims, 3 Drawing Sheets

MOLTEN CARBONATE FUEL CELL

BACKGROUND OF THE INVENTION

1. Field of the Invention

The present invention relates to a molten carbonate fuel cell and, more particularly, to a molten carbonate fuel cell in which an electrolyte body sandwiched between a pair of electrodes is improved.

2. Description of the Related Art

Figure 1:
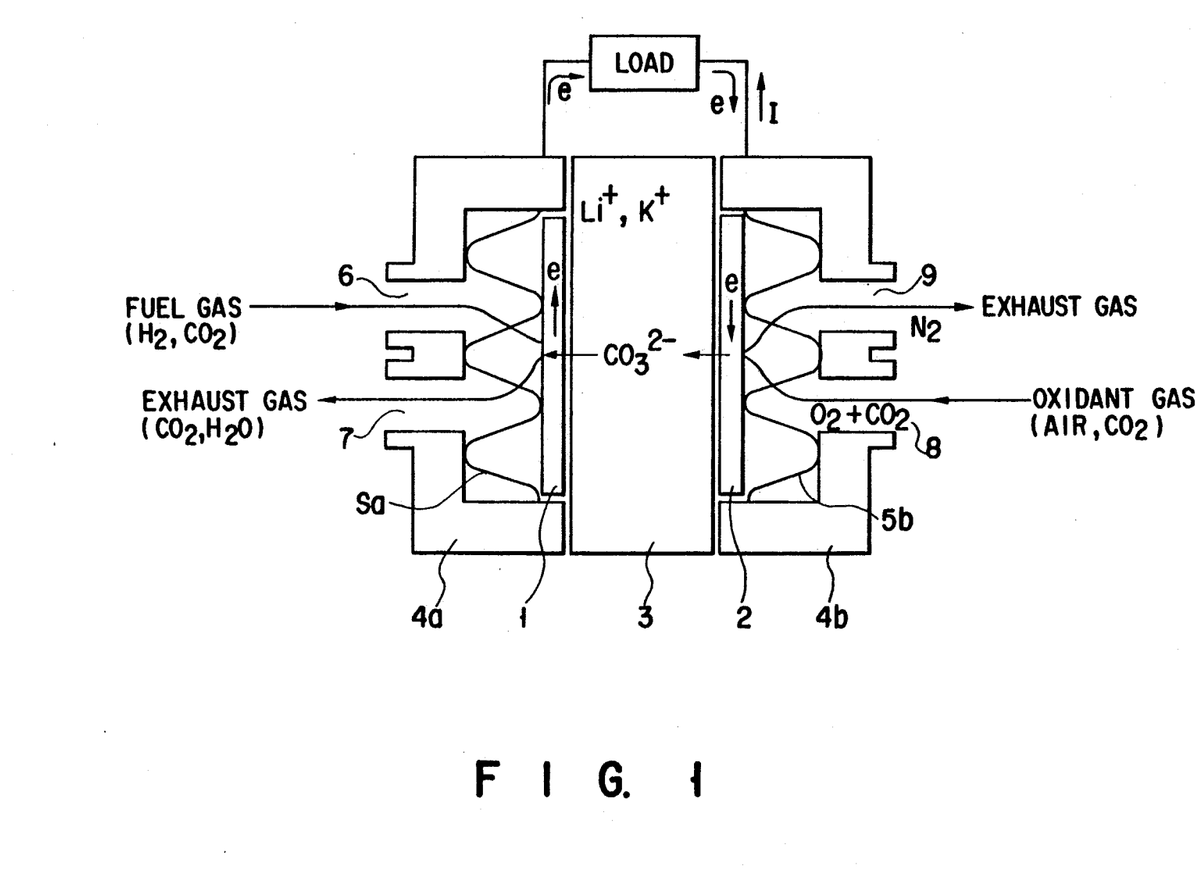
FIG. 1 is a schematic view showing a basic structure of a molten carbonate fuel cell.

A basic structure of a molten carbonate fuel cell is shown in FIG. 1. An electrolyte body 3 retaining an electrolyte consisting of an alkali carbonate is sandwiched between an anode (fuel electrode) 1 and a cathode (air electrode) 2 which serve as a pair of electrodes. Two housings 4a and 4b abut against peripheral portions of both surfaces of the electrolyte body 3. The anode 1 and the cathode 2 are stored in the housings 4a and 4b, respectively. Corrugated collectors 5a and 5b are arranged in a space defined between the housing 4a and the anode 1 and a space defined between the housing 4b and the cathode 2, respectively. A supply port 6 for supplying fuel gas ($H_2$ and $CO_2$) to the anode 1 and an exhaust port 7 for exhausting exhaust gas ($CO_2$ and $H_2O$) from the anode 1 are formed in the housing 4a in which the anode 1 is arranged. A supply port 8 for supplying an oxidant gas (air and $CO_2$) to the cathode 2 and an exhaust port 9 for exhausting an exhaust gas ($N_2$) from the cathode 2 are formed in the housing 4b in which the cathode 2 is arranged.

In the molten carbonate fuel cell shown in FIG. 1 an alkali carbonate mixture in the electrolyte body 3 is melted at a high temperature. The fuel gas ($H_2$ and $CO_2$) is supplied to the anode 1 through the supply port 6 of the housing 4a, while the oxidant gas (air and $CO_2$) is supplied to the cathode 2 through the supply port 8 of the housing 4b. Thereby causing a reaction represented by formula (1) at the anode 1 and a reaction represented by formula (2) at the cathode 2:

$$H_2 + CO_3^{2-} \rightarrow H_2O + CO_2 + 2e^- \quad (1)$$

$$\tfrac{1}{2}O_2 + CO_2 + 2e^- \rightarrow CO_3^{2-} \quad (2)$$

The electrolyte body used in the molten carbonate fuel cell serves not only a medium for migration of carbonate ions ($CO_3^{2-}$) but also a gas permeation barrier layer for inhibiting direct mixture (gas crossover) of reaction gases between the anode and the cathode. In order to perform these functions, the electrolyte must be sufficiently retained in the electrolyte body. An outflow of the electrolyte (electrolyte loss) increases an internal resistance and occurrence of a gas crossover.

The electrolyte body is basically obtained by a matrix method in which a porous body is formed by a ceramic filler, and the porous body is impregnated with an electrolyte consisting of an alkali carbonate mixture containing at least two carbonates selected from the group consisting of $Li_2CO_3$, $K_2CO_3$, and $Na_2CO_3$.

The filler consists of particles (to be referred to as retaining particles hereinafter) having a particle size of, e.g., 1 μm or less and a function of retaining the electrolyte, and particles (to be referred to as reinforcing particles hereinafter) having a particle size of, e.g., 10 μm or more and a function of reinforcing the porous body. The function of retaining the electrolyte indicates retention of the electrolyte as a fluid and prevention of outflow thereof during a high-temperature operation. The function of reinforcing the porous body indicates prevention of cracks and collapse of the porous body upon a rise and a fall in temperature.

Conventionally, the retaining particles constituting the filler are $LiAlO_2$ particles having a specific surface area of 5 m²/g to 25 m²/g. The reinforcing particles are $LiAlO_2$ particles homogeneous to the retaining particles.

A compound (e.g., $LiAlO_2$) relatively stable in a molten carbonate is used as the filler. An electrolyte body comprising a porous body containing the $LiAlO_2$-retaining and reinforcing particles as the filler poses the following problem. When the porous body is kept together with a highly corrosive molten carbonate for a long period of time, the retaining particles are absorbed in the reinforcing particles having a larger particle size than that of the retaining particles. The retaining particles thus disappear. As a result, the pore size of the porous body as a skeleton for retaining the electrolyte is increased. The retaining function of the electrolyte of the electrolyte body is degraded to cause outflow of the electrolyte to result in an electrolyte loss and a gas crossover accompanying local dissipation of the electrolyte. Cell performance properties are then greatly degraded.

SUMMARY OF THE INVENTION

It is an object of the present invention to provide molten carbonate fuel cell having a long life time wherein outflow of an electrolyte (i.e., an electrolyte loss) from an electrolyte body is reduced to prevent an increase in internal resistance of the electrolyte body and occurrence of a gas crossover.

According to the present invention, there is provided a molten carbonate fuel cell comprising:

a pair of conductive electrodes;

an electrolyte body sandwiched between the pair of electrodes and constituted by a porous body containing as a filler at least two heterogeneous particles selected from the group consisting of $LiAl_xO_y$ ($4.5 \leq x \leq 5.5$ and $7.25 \leq y \leq 8.75$), $LiAl_aO_b$ ($0.89 \leq a \leq 1.11$ and $1.80 \leq b \leq 2.20$), lithium zirconate, and stabilized zirconia, and an electrolyte containing an alkali carbonate mixture impregnated in the porous body;

fuel gas supplying means for supplying a fuel gas to one of the pair of electrodes; and oxidant gas supplying means for supplying an oxidant gas to the other of the pair of electrodes.

According to the present invention, there is also provided a molten carbonate fuel cell comprising:

a pair of conductive electrodes;

an electrolyte body sandwiched between the pair of electrodes and constituted by an electrolyte containing an alkali carbonate mixture and a porous body containing a filler and having pores having a diameter of not less than 2.0 μm at a volume ratio of not more than 20% upon being impregnated with the electrolyte in a molten state of not more than 700° C. for 10,000 hours;

fuel gas supplying means for supplying a fuel gas to one of the pair of electrodes; and oxidant gas supplying means for supplying an oxidant gas to the other of the pair of electrodes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

A molten carbonate fuel cell according to the present invention will be described in detail with reference to FIGS. 2 and 3 below.

The molten carbonate fuel cell according to the present invention comprises an anode (fuel electrode) 11, a cathode (air electrode) 12, and an electrolyte body 13 sandwiched between the anode 11 and the cathode 12. The electrolyte body 13 retains an electrolyte. The anode 11, the cathode 12, and the electrolyte body 13 constitute a unit cell. A plurality of unit cells are stacked with separators 14. A pair of opposite edges portion of the anode 11 located on the upper surface of the electrolyte body 13 are located inward from the edge of the electrolyte body 13 by a predetermined distance. The edge seal plates 15a is located between the separator 14 and each edge portion of the electrolyte body 13 over which the anode 11 dose not extents. A pair of edge portions, perpendicular to the edge seal plate 15a, of the cathode 12 located on the lower surface of the electrolyte body 13, are located inward from the edge portions of the electrolyte body 13 by a predetermined distance. The edge seal plates 15b is located between the separator 14 and each edge portion of the electrolyte body 13 over which the cathode 12 does not extents. A conductive perforated plate 16a serving as a collector and a corrugated plate 17a are sequentially stacked from the anode 11 in a space (i.e., a fuel gas flow space) defined by the anode 11, the separator 14, and the edge seal plate 15a. A conductive perforated plate 16b saving as a collector and a corrugated plate 17b are sequentially stacked from the cathode 12 in a space (i.e., an oxidant gas flow space) difiued by the cathode 12, the separator 14, and the edge seal plate 15b. Manifolds 19 each having a frame-like flange 18 are located at four side surfaces of a stacked power generating assembly obtained by stacking a plurality of such unit cell, with the separators 14 interposed between then.

Four frame-like manifold seal plates 20 are interposed between the four side surfaces of the stacked power generating assembly and the flanges 18 of the manifolds 19, respectively. A supply pipe 22 for supplying a fuel gas 21 is connected to the manifold (not shown) corresponding to the side surface of the power generating assembly to which the fuel gas flow space is exposed. A gas exhaust pipe 23 is connected to the manifold 19 at the position opposite to the supply pipe 22. A supply pipe 25 for supplying an oxidant gas 24 is connected to the manifold (not shown) corresponding to the side surface of the power generating assembly to which the oxidant gas flow space is exposed. An gas exhaust pipe 26 is connected to the manifold opposite to the supply pipe 25.

Each of the anode 11 and the cathode 12 is made of a nickel-based alloy or a porous sintered body of the nickel-based alloy.

The separators 14, the edge seal plates 15a and 15b, the perforated plates 16a and 16b, and the corrugated plates 17a and 17b are made of, e.g., stainless steel.

A gas mixture of, e.g., hydrogen ($H_2$) and carbon dioxide ($CO_2$) can be used the fuel gas. A gas mixture of carbon dioxide ($CO_2$) and air or oxygen ($O_2$) can be used as the oxidant gas.

The electrolyte body 13 comprises a porous body to be described in detail later and an electrolyte impregnated in the porous body.

(A) Porous Body

This porous body contains as a filler at least two heterogeneous particles selected from the group consisting of $LiAl_xO_y$ ($4.5 \leq x \leq 5.5$ and $7.25 \leq y \leq 8.75$), $LiAl_aO_b$ ($0.89 \leq a \leq 1.11$ and $1.80 \leq b \leq 2.20$), lithium zirconate, and stabilized zirconia. Note that definitions of x, y, a, and b in $LiAl_xO_y$ and $LiAl_aO_b$ will not be repeated in the following description.

A typical example of $LiAl_xO_y$ is $LiAl_5O_8$.

A typical example of $LiAl_aO_b$ is $LiAlO_2$.

The lithium zirconate includes lithium zirconate stabilized with MgO, $Y_2O_3$, or CaO. This stabilized lithium zirconate can be synthesized by causing zirconia or zirconia stabilized with MgO, $Y_2O_3$, or CaO to react with a lithium carbonate, nitrate, or hydroxide.

The stabilized zirconia is stabilized with MgO, $Y_2O_3$, or CaO.

The filler is preferably constituted by the particles (i.e., the retaining particles) having the function of retaining the electrolyte and a particle size of 1 μm or less, and the particles (i.e., reinforcing particles) which are materially different from the retaining particles and which have the function of reinforcing the porous body and a particle size of 5 to 100 μm.

The term "materially different" indicates that the retaining and reinforcing particles are made of different materials, and that the same material is used as a starting material for the retaining and reinforcing particles, and another material is added to one of the materials of the retaining and reinforcing particles to obtain different compositions. Note that the particle size indicates that of primary particles.

The particle size of the retaining particles preferably falls within the range of 0.05 to 0.5 μm. In particular, the retaining particles preferably have a specific surface area of 5 to 20 m$^2$/g and more preferably 9 to 11 m$^2$/g. If the specific surface area of the retaining particles is less than 5 m$^2$/g, the retention characteristics of the electrolyte may be degraded. However, when the specific surface area of the retaining particles exceeds 20 m$^2$/g, it may be difficult to form a porous body.

The retaining particles are preferably formed by at least one material selected from the group consisting of $LiAl_xO_y$, $LiAl_aO_b$, lithium zirconate, and stabilized zirconia. The retaining particles are preferably formed by at least one of the following materials.

(a) Retaining particles consisting of a mixture of $LiAl_xO_y$ and $LiAl_aO_b$: This mixture preferably contains 0.1 wt % or more of $LiAl_xO_y$ and more preferably 1 wt % or more thereof. This mixture is preferably prepared using γ-$LiAl_aO_b$ as the $LiAl_aO_b$ in favor of higher phase stability in the electrolyte.

(b) Retaining particles consisting of lithium zirconate.

(c) Retaining particles consisting of a mixture of lithium zirconate and $LiAl_aO_b$: This mixture preferably contains 30 to 70 wt % of the lithium zirconate and more preferably 40 to 60 wt % due to the following reason. When the content of the lithium zirconate is less than 40 wt %, the content of the $LiAl_aO_b$ is relatively increased to easily cause growth between the $LiAl_aO_b$ particles. However, when the content of the lithium zirconate exceeds 70 wt %, growth between the lithium zirconate particles tends to occur.

(d) Retaining particles consisting of a mixture of $LiAl_xO_y$, $LiAl_aO_b$, and lithium zirconate.

(e) Retaining particles consisting of a mixture of $LiAl_xO_y$, $LiAl_aO_b$, and stabilized zirconia.

The particle size of the reinforcing particles is defined due to the following reason. When the particle size of the reinforcing particles is less than 5 μm, a crack prevention effect of the electrolyte body cannot be sufficiently enhanced. However, when the particle size of the reinforcing particles exceeds 100 μm, cracks tend to occur during molding. The particle size of the reinforcing particles preferably falls within the range of 10 to 60 μm.

The reinforcing particles are made of at least one material selected from the group consisting of $LiAl_aO_b$, lithium zirconate, and stabilized zirconia and is particularly made of $LiAl_aO_b$.

The filler is preferably formed selecting the following materials as the retaining and reinforcing particles.

(a) A filler made of reinforcing particles consisting of a mixture of $LiAl_xO_y$ and $LiAl_aO_b$ and reinforcing particles consisting of $LiAl_aO_b$.

(b) A filler made of retaining particles consisting of a mixture of lithium zirconate and $LiAl_aO_b$ and reinforcing particles consisting of $LiAl_aO_b$.

(c) A filler made of retaining particles consisting of a mixture of $LiAl_xO_y$, $LiAl_aO_b$, and lithium zirconate and reinforcing particles consisting of $LiAl_aO_b$.

(d) A filler made of retaining particles consisting of a mixture of $LiAl_xO_y$, $LiAl_aO_b$, and stabilized zirconia and reinforcing particles consisting of $LiAl_aO_b$.

Of all the filters (a) to (d), the most preferable filler is the filler (d) and particularly a filler containing zirconia stabilized with MgO as the stabilized zirconia.

The filler contains 50 to 90 wt % and more preferably 60 to 90 wt % of the retaining particles, and 10 to 50 wt % and more preferably 10 to 40 wt % of the reinforcing particles. When the content of the reinforcing particles is less than 10 wt %, a thermal cycle resistance may be degraded. When the content of the reinforcing particles exceeds 50 wt %, the content of the retaining particles is relatively decreased to cause a decrease in retention capacity of the electrolyte.

The porous body preferably has a porosity of, e.g., 40 to 65%. The porous body having a porosity in this range can properly retain the electrolyte and at the same time maintains a predetermined strength.

The porous body preferably has properties in which pores having a diameter of 2.0 μm or more can be maintained at a volume ratio of 20% or less upon being impregnated with the electrolyte in a molten state of 700° C. or less for 10,000 hours. The volume ratio of the pore sizes of the porous body is defined due to the following reason. When the volume ratio exceeds 20%, the non-filler portion of the electrolyte which corresponds to the volume ratio is formed in the electrolyte body obtained by impregnating the porous body with the electrolyte. As a result, an increase in internal resistance and generation of a gas crossover, which are caused by an increase in voids in the electrolyte body cannot be effectively suppressed.

(B) Electrolyte

This electrolyte consists of an alkali carbonate mixture or a mixture of the alkali carbonate mixture and an alkali earth carbonate or oxide.

Examples of the alkali carbonate mixture are a mixture of lithium carbonate ($Li_2CO_3$) and potassium carbonate ($K_2CO_3$), a mixture of $Li_2CO_3$ and sodium carbonate ($Na_2CO_3$), and a mixture of $Li_2CO_3$, $K_2CO_3$, and $Na_2CO_3$.

The alkali earth carbonate is made of at least one material selected from the group consisting of calcium carbonate, magnesium carbonate, and barium carbonate. These materials can be used singly or in a mixture of at least two materials. Examples of the alkali earth oxide are calcium oxide, magnesium oxide, and barium oxide. These materials are used singly or in a mixture of at least two materials. The content of the alkali earth carbonate or oxide is preferably 2 to 15 mol % and more preferably 5 to 10 mol % in the electrolyte.

The electrolyte body is manufactured by the following method.

(1) The filler and an organic binder are mixed in the presence of an organic solvent. Examples of the organic binder are polyvinyl butyral, a plasticizer, and an acrylic resin. Examples of the organic solvent are toluene, xylene, and methyl ethyl ketone. The mixture is formed into a green sheet in accordance with a normal sheet forming method (e.g., a doctor blade method, a calender roll method, a slip cast method, or a cold extrusion method), and the green sheet is degreased to obtain a porous body having a predetermined porosity.

An electrolyte consisting of an alkali carbonate mixture is formed into a sheet-like body by the same method as in the porous body.

The sheet-like body is stacked on the porous body, and the organic binder of the sheet-like body is removed. The electrolyte is melted and impregnated in the porous body to manufacture an electrolyte body.

Figure 2:
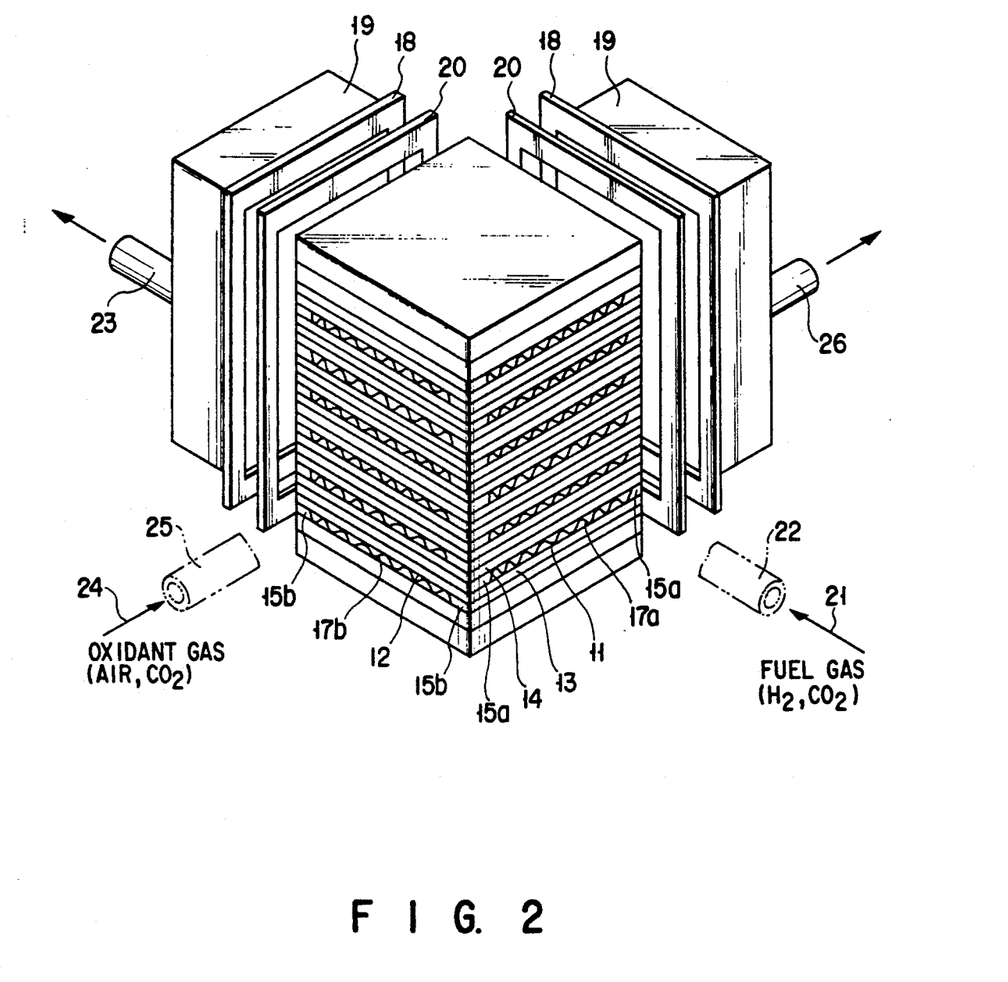
FIG. 2 is a perspective view showing a general structure of a molten carbonate fuel cell according to the present invention.

(2) The electrolyte body manufactured by the method (1) is sandwiched between an anode impregnated with an electrolyte consisting of an alkali carbonate mixture in advance and a non-impregnated cathode to obtain a unit cell shown in FIG. 2. A plurality of unit cells are stacked through separators to obtain a stacked power generating assembly. Manifolds are mounted on four side surfaces of this power generating assembly to assemble a fuel cell.

According to the present invention, since an electrolyte body is constituted by a porous body containing as a filler at least two heterogeneous particles selected from the group consisting of $LiAl_xO_y$ ($4.5 \leq x \leq 5.5$ and $7.25 \leq y \leq 8.75$), $LiAl_aO_b$ ($0.89 \leq a \leq 1.11$ and $1.80 \leq b \leq 2.20$), lithium zirconate, and stabilized zirconia, and an electrolyte containing an alkali carbonate mixture impregnated in the porous body, the electrolyte can be properly retained in the electrolyte body for a long period of time. As a result, outflow of the electrolyte from the electrolyte body can be reduced, so that a long-life molten carbonate fuel cell in which an increase in internal resistance and generation of a gas crossover accompanying the outflow of the electrolyte can be suppressed can be obtained.

More specifically, in a filler constituting the porous body, when retaining particles used to retain the electrolyte are materially homogeneous with reinforcing particles used to prevent cracks in a thermal cycle, the retaining particles are absorbed in the reinforcing particles and the electrolyte retention properties of the porous body is lost.

Under the above circumstances, according to the present invention, the porous body is formed by at least two heterogeneous particles (i.e., the retaining and reinforcing particles materially different from each other) selected from the group consisting of $LiAl_xO_y$, $LiAl_aO_b$, lithium zirconate, and stabilized zirconia. The retaining particles can be prevented from being absorbed in the reinforcing particles. As a result, as described above, since the electrolyte can be properly retained in the electrolyte for a long period of time, there is provided a molten carbonate fuel cell in which outflow of the electrolyte from the electrolyte body can be reduced to suppress the increase in internal resistance and generation of a gas crossover caused by the outflow of the electrolyte.

In addition, as compared with $LiAl_aO_b$. since a mixture of $LiAl_xO_y$ and $LiAl_aO_b$ has a nature which makes it difficult to cause a phase transformation in a molten electrolyte containing an alkali carbonate mixture, particle growth can be suppressed. In particular, a mixture containing $LiAl_x O_y$, $LiAl_aO_b$, and stabilized zirconia (e.g., MgO-stabilized zirconia) has a nature in which phase transformation is more difficult to occur in the molten electrolyte containing the alkali carbonate mixture, as compared with $LiAl_aO_b$ or zirconia due to interaction between the materials of this mixture. Therefore, particle growth can be greatly suppressed.

An electrolyte body obtained by impregnating the electrolyte in the porous body containing a filler consisting of retaining particles of the $LiAl_xO_y$ and reinforcing particles materially different from the retaining particles can properly suppress particle growth of the retaining particles themselves, so that the electrolyte can be properly retained for a long period of time. As a result, there is provided a molten carbonate fuel cell in which outflow of the electrolyte from the electrolyte body can be reduced to suppress the increase in internal resistance and generation of a gas crossover caused by the outflow of the electrolyte.

Lithium zirconate can suppress consumption of the alkali carbonate mixture serving as a major constituent of the electrolyte and particle growth.

More specifically, when a fuel cell incorporating an electrolyte body having a structure obtained by impregnating a porous body with a filler consisting of zirconia ($ZrO_2$) is operated at a high temperature, this zirconia reacts with the alkali carbonate mixture (e.g., $Li_2CO_3$) serving as the major constituent of the electrolyte as follows:

$$ZrO_2 + Li_2CO_3 \rightarrow Li_2ZrO_3 + CO_2$$

When $ZrO_2$ is used as the filler represented by the above formula, $Li_2CO_3$ is consumed. As a result, the electrolyte is consumed, and at the same time particle growth is enhanced along with production of $Li_2ZrO_3$.

When the retaining particles consisting of lithium zirconate are used as described above, the reaction on the left-hand side can be suppressed, so that consumption of the electrolyte and particle growth can be suppressed. In particular, MgO-, $Y_2O_3$-, or CaO-stabilized lithium zirconate has a nature in which phase transformation can hardly occur in the molten electrolyte, and particle growth can be further suppressed. In addition, a mixture of lithium zirconate and $LiAl_aO_b$ has a nature in which phase transformation is more difficult to occur in the molten electrolyte containing the alkali carbonate mixture, as compared with $LiAl_aO_b$ or zirconia due to the interaction between the materials of this mixture. Therefore, particle growth can be further suppressed.

An electrolyte body obtained by impregnating the electrolyte in the porous body containing a filler consisting of retaining particles of the lithium zirconate and reinforcing particles materially different from the retaining particles can properly suppress particle growth of the retaining particles themselves, so that the electrolyte can be properly retained for a long period of time. As a result, there is provided a molten carbonate fuel cell in which outflow of the electrolyte from the electrolyte body can be reduced to suppress the increase in internal resistance and generation of a gas crossover caused by the outflow of the electrolyte.

Furthermore, according to the present invention, an electrolyte body is constituted by an electrolyte containing an alkali carbonate mixture and a porous body containing a filler and having pores having a diameter of 2.0 μm or more at a volume ratio of 20% or less upon being impregnated with the electrolyte in a molten state of 700° C. or less for 10,000 hours. The moving resistance of the electrolyte in a molten or liquid state in the electrolyte body during an operation can be maintained without degrading cell performance. The outflow of the electrolyte can be reduced, and the increase in resistance of the electrolyte body and generation of the crossover which are caused by outflow of the electrolyte can be suppressed. Therefore, there is provided a long-life molten carbonate fuel cell capable of performing an operation for a long period of time.

DETAILED DESCRIPTION OF THE PREFERRED EMBODIMENTS

The present invention will be described in detail by way of its examples below.

EXAMPLE 1

A filler of a composition having 70 g of retaining particles consisting of a mixture of 1.0 wt % of $LiAl_5O_8$ and the balance of $LiAlO_2$ and having a specific surface area of 10 m$^2$/g and a particle size of about 0.3 μm, and 30 g of reinforcing particles consisting of $LiAlO_2$ having a particle size of 20 μm was placed in an alumina pot, and polyvinyl butyral and dibutyl phthalate in a total amount of 30 g, 100 g of toluene, and the filler were mixed by a wet method for 20 hours to prepare a slurry. The slurry was defoamed and developed into a carrier sheet. The dried green sheet was degreased to obtain a porous body. This porous body had a porosity of 50% and an average pore size of 0.23 μm.

EXAMPLE 2

A porous body was manufactured following the same procedures as in Example 1, except that a filler of a composition having 70 g of retaining particles consisting of a mixture of 1.0 wt % of $LiAl_5O_8$ and the balance of $LiAlO_2$ and having a specific surface area of 8 m$^2$/g and a particle size of about 0.3 μm, and 30 g of reinforcing particles consisting of $LiAlO_2$ having a particle size of 20 μm was used. This porous body had a porosity of 50% and an average pore size of 0.25 μm.

EXAMPLE 3

A porous body was manufactured following the same procedures as in Example 1, except that a filler of a composition having 70 g of retaining particles consisting of a mixture of 3.0 wt % of $LiAl_5O_8$ and the balance of $LiAlO_2$ and having a specific surface area of 10 $m^2/g$ and 10 a particle size of about 0.3 $\mu m$, and 30 g of reinforcing particles consisting of $LiAlO_2$ having a particle size of 20 $\mu m$ was used. This porous body had a porosity of 53% and an average pore size of 0.23 $\mu m$.

EXAMPLE 4

A porous body was manufactured following the same procedures as in Example 1, except that a filler of a composition having 80 g of retaining particles consisting of a mixture of 3.0 wt % of $LiAl_5O_8$ and the balance of $LiAlO_2$ and having a specific surface area of 10 $m^2/g$ and a particle size of about 0.3 $\mu m$, and 20 g of reinforcing particles consisting of $LiAlO_2$ having a particle size of 20 $\mu m$ was used This porous body had a porosity of 55% and an average pore size of 0.21 $\mu m$.

EXAMPLE 5

A porous body was manufactured following the same procedures as in Example 1, except that a filler of a composition having 70 g of retaining particles consisting of a mixture of 5.0 wt % of $LiAl_5O_8$ and the balance of $\gamma$-$LiAlO_2$ and having a specific surface area of 10 $m^2/g$ and a particle size of about 0.3 $\mu m$, and 30 g of reinforcing particles consisting of LiAlO2 having a particle size of 20 $\mu m$ was used. This porous body had a porosity of 53% and an average pore size of 0.23 $\mu m$.

EXAMPLE 6

A porous body was manufactured following the same procedures as in Example 1, except that a filler of a composition having 70 g of retaining particles consisting of a mixture of 5.0 wt % of $LiAl_5O_8$ and the balance of $\gamma$-$LiAlO_2$ and having a specific surface area of 8 $m^2/g$ and a particle size of about 0.3 $\mu m$, and 30 g of reinforcing particles consisting of $LiAlO_2$ having a particle size of 20 $\mu m$ was used. This porous body had a porosity of 50% and an average pore size of 0.25 $\mu m$.

EXAMPLE 7

A porous body was manufactured following the same procedures as in Example 1, except that a filler of a composition having 70 g of retaining particles consisting of a mixture of 3.0 wt % of $LiAl_5O_8$ and the balance of $\gamma$-$LiAlO_2$ and having a specific surface area of 10 $m^2/g$ and a particle size of about 0.3 $\mu m$, and 30 g of reinforcing particles consisting of $LiAlO_2$ having an average particle size of 20 $\mu m$ was used. This porous body had a porosity of 53% and an average pore size of 0.23 $\mu m$.

EXAMPLE 8

A porous body was manufactured following the same procedures as in Example 1, except that a filler of a composition having 70 g of retaining particles consisting of a mixture of 1.0 wt % of $LiAl_5O_8$ and the balance of $\gamma$-$LiAlO_2$ and having a specific surface area of 10 $m^2/g$ and a particle size of about 0.3 $\mu m$, and 30 g of reinforcing particles consisting of LiAlO2 having an average particle size of 20 $\mu m$ was used. This porous body had a porosity of 53% and an average pore size of 0.23 $\mu m$.

EXAMPLE 9

A porous body was manufactured following the same procedures as in Example 1, except that a filler of a composition having 80 g of retaining particles consisting of a mixture of 5.0 wt % of $LiAl_5O_8$ and the balance of $\gamma$-$LiAlO_2$ and having a specific surface area of 10 $m^2/g$ and a particle size of about 0.3 $\mu m$, and 20 g of reinforcing particles consisting of $LiAlO_2$ having a particle size of 20 $\mu m$ was used. This porous body had a porosity of 55% and an average pore size of 0.21 $\mu m$.

COMPARATIVE EXAMPLE 1

A porous body was manufactured following the same procedures as in Example 1, except that a filler of a composition having 70 g of retaining particles consisting of $LiAlO_2$ and having a specific surface area of 10 $m^2/g$ and a particle size of about 0.3 $\mu m$, and 30 g of reinforcing particles consisting of the same material as that of the retaining particles and having a particle size of 20 fm was used. This porous body had a porosity of 55% and an average pore size of 0.21 $\mu m$.

COMPARATIVE EXAMPLE 2

A porous body was manufactured following the same procedures as in Example 1, except that a filler of a composition having 70 g of retaining particles consisting of a mixture of 3.0 wt % of $\alpha$-$LiAlO_2$ and the balance of $\gamma$-$LiAlO_2$ and having a specific surface area of 10 $m^2/g$ and a particle size of about 0.3 $\mu m$, and 30 g of reinforcing particles consisting of the same material as that of the retaining particles and having a particle size of 20 $\mu m$ was used. This porous body had a porosity of 57% and an average pore size of 0.22 $\mu m$.

COMPARATIVE EXAMPLE 3

A porous body was manufactured following the same procedures as in Example 1, except that a filler of a composition having 50 g of retaining particles consisting of a mixture of 3.0 wt % of $\alpha$-$LiAlO_2$ and the balance of $\gamma$-$LiAlO_2$ and having a specific surface area of 10 $m^2/g$ and a particle size of about 0.3 $\mu m$ and 50 g of reinforcing particles consisting of the same material as that of the retaining particles and having a particle size of 20 $\mu m$ was used. This porous body had a porosity of 53% and an average pore size of 0.27 $\mu m$.

The porous bodies in Examples 1 to 9 and Comparative Examples 1 to 3 were cut into square pieces each having a size of 4 cm×4 cm, and sheet-like bodies each containing an alkali carbonate mixture (62 mol % of $Li_2CO_3$ and 38 mol % of $K_2CO_3$) were stacked on the pieces, respectively. The stacked structures were heated to 550 xC to melt the sheet-like bodies, thereby obtaining electrolyte bodies impregnated with the alkali carbonate mixtures. Each sheet-like body was prepared such that each alkali carbonate mixture was mixed with polyvinyl butyral, dibutyl phthalate, and 100 g of toluene in an alumina pot by a wet method to prepare a slurry, the slurry was defoamed and developed into a carrier sheet, and the resultant green sheet was degreased.

Each electrolyte body was placed in a gas mixture (70 vol % of air and 30 vol % $CO_2$) atmosphere at 650° C. for 10,000 hours and was then cooled and dipped in an acetic acid solution (80 vol % of glacial acetic acid and 20 vol % of acetic anhydride) to eliminate the alkali carbonate mixture. The ratio of pores (macropores) having a diameter of 2.0 $\mu m$ or more, that is, the macroporosity, was measured by a mercury intrusion method. Test results are shown in Table 1.

Figure 3:
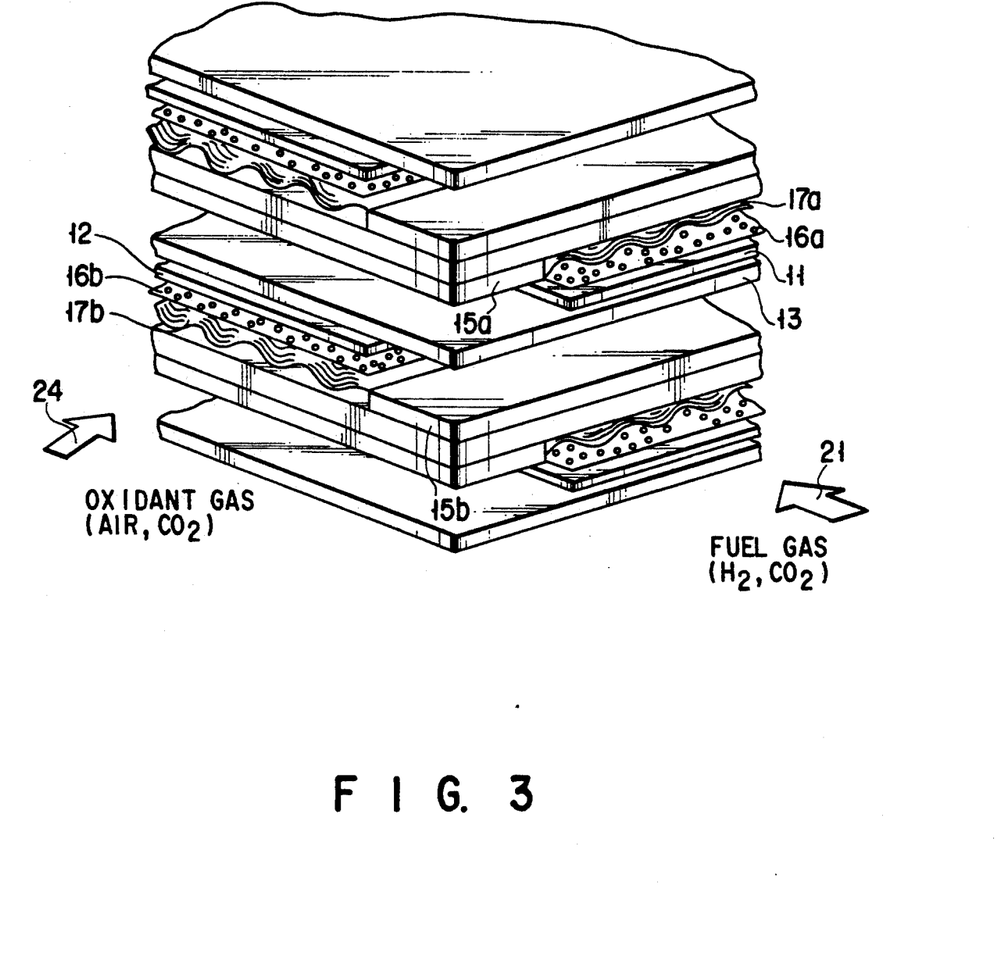
FIG. 3 is an exploded perspective view of a main part in FIG. 2.

Each electrolyte body, an anode and a cathode which were made of a nickel-based alloy, a stainless steel separator, an edge seal plate, a perforated plate, and a corrugated plate were used to assemble each molten carbonate fuel cell shown in FIGS. 2 and 3. A gas mixture of 80 vol % of $H_2$ and 20 vol % of $CO_2$ as a fuel gas was supplied to the anode of each fuel cell, and a gas mixture of 70 vol % of air and 30 vol % of $CO_2$ as an oxidant gas was supplied to the cathode of each molten carbonate fuel cell. A cell test was performed under the load condition of 150 mA/cm$^2$ at 650° C. The cell test was continuously performed for 3,000 hours. The cell performance and electrolyte loss upon a lapse of 3,000 hours were examined. Results are also summarized in Table 1 below.

TABLE 1

| | Composition of Porour Body | | | | | Cell Characteristics after 3,000 Hours | |
|---|---|---|---|---|---|---|---|
| | Retaining Particles | | | | | | |
| | Content of $LiAl_5O_8$ (wt %) | Specific Surface Area (m$^2$/g) | Content | Content of Reinforcing Particles* | Macroporosity after 10,000 Hours (%) | Operating Voltage Drop (mV) | Electrolyte Loss (%) |
| Example 1 | 1.0 | 10 | 70 g | 30 g | 13 | 66 | 10 |
| Example 2 | 1.0 | 8 | 70 g | 30 g | 15 | 80 | 11 |
| Example 3 | 3.0 | 10 | 70 g | 30 g | 10 | 41 | 9 |
| Example 4 | 3.0 | 10 | 80 g | 20 g | 7 | 52 | 8 |
| Example 5 | 5.0 | 10 | 70 g | 30 g | 7 | 50 | 7 |
| Example 6 | 5.0 | 8 | 70 g | 30 g | 14 | 70 | 10 |
| Example 7 | 3.0 | 10 | 70 g | 30 g | 11 | 62 | 9 |
| Example 8 | 1.0 | 10 | 70 g | 30 g | 12 | 68 | 10 |
| Example 9 | 5.0 | 10 | 80 g | 20 g | 5 | 48 | 5 |
| Comparative 1 | 0 | 10 | 70 g | 30 g | 25 | 165 | 29 |
| Comparative 2 | 3.0** | 10 | 70 g | 30 g | 24 | 285 | 34 |
| Comparative 3 | 3.0** | 10 | 50 g | 50 g | 29 | 305 | 38 |

*The reinforcing particles consist of $LiAlO_2$.
**The value indicates the content of $\alpha$-$LiAlO_2$.

As is apparent from Table 1, the electrolyte bodies having the porous bodies in Examples 1 to 9 have low macroporosities after the electrolyte bodies are kept in the gas mixture atmosphere for 10,000 hours. That is, the porous bodies of Examples 1 to 9 have properties in which when these porous bodies are impregnated with electrolytes consisting of alkali carbonate mixtures in a molten state of 700° C. or less for 10,000 hours, pores having a diameter of 2.0 μm or more are formed at a volume ratio of 20% or less. As a result, the molten carbonate fuel cells incorporating these electrolyte bodies have operating voltage drops of 100 mV or less upon operation for 3,000 hours and maintain good performance with small electrolyte losses. To the contrary, it is apparent that the electrolyte bodies having the porous bodies of Comparative Examples 1 to 3 have high macroporosities after the plates are kept in the gas mixture atmosphere for 10,000 hours. As a result, the molten carbonate fuel cells incorporating these electrolyte bodies have operating voltage drops of 100 mV or more and exhibit significant degradation in performance and large electrolyte losses. The macroporosities of the electrolyte bodies having the porous bodies (Comparative Examples 2 and 3) consisting of mixtures of $\alpha$-$LiAlO_2$ and the balance of $\gamma$-$LiAlO_2$ have particularly high macroporosities.

EXAMPLE 10

Zirconia having a specific surface area of 10 m$^2$/g and an $Li_2CO_3$ powder were mixed in equimolar amounts, and the resultant mixture was heat-treated in air at 1,000° C. for 10 hours to synthesize lithium zirconate ($Li_2ZrO_3$) having the same specific surface area as that of the zirconia.

A filler consisting of 70 g of retaining particles containing a mixture of 5 wt % of $LiAl_5O_8$, 50 wt % of $Li_2ZrO_3$, and the balance of $LiAlO_2$, and having a specific surface area of 10 m$^2$/g and a particle size of about 0.3 μm, and 30 g of reinforcing particles consisting of $LiAlO_2$ and having a particle size of 20 μm was filled in an alumina pot. The filler was mixed with polyvinyl butyral and dibutyl phthalate in a total amount of 30 g and 100 g of toluene by a wet method for 20 hours to prepare a slurry. The slurry was defoamed and developed into a carrier sheet. The dried green porous body had a porosity of 56% and an average pore size of 0.23 μm.

EXAMPLE 11

A porous body was manufactured following the same procedures as in Example 10 except that a filler consisting of 70 g of retaining particles containing a mixture of 5 wt % of $LiAl_5O_8$, 50 wt % of MgO-stabilized zirconia, and the balance of $LiAlO_2$, and having a specific surface area of 10 m$^2$/g and a particle size of about 0.3 μm, and 30 g of reinforcing particles consisting of $LiAlO_2$ and having a particle size of 20 μm was used. This porous body had a porosity of 55% and an average pore size of 0.22 μm.

The porous bodies in Examples 10 and 11 were cut into square pieces each having a size of 4 cm × 4 cm, and sheet-like bodies each containing an alkali carbonate mixture (62 mol % of $Li_2CO_3$ and 38 mol % of $K_2CO_3$) as in Examples 1 to 9 were stacked on the pieces, respectively. The stacked structures were heated to 550° C. to melt the sheet-like bodies thereby obtaining electrolyte bodies impregnated with the alkali carbonate mixtures.

The ratio of pores (macropores) having a diameter of 2.0 μm or more, that is, the macroporosity, of each electrolyte body was measured following the same procedures as in Examples 1 to 9. Results are shown in Table 2.

Each electrolyte body, an anode and a cathode which were made of a nickel-based alloy, a stainless steel separator, an edge seal plate, a perforated plate, and a corrugated plate were used to assemble each molten carbonate fuel cell shown in FIGS. 2 and 3. A cell test was continuously performed for 3,000 hours under the same condition as in Examples 1 to 9. The cell performance and electrolyte loss upon a lapse of 3,000 hours were examined. Results are also summarized in Table 2 below.

TABLE 2

|  | Macroporosity after 10,000 Hours (%) | Cell Characteristics after 3,000 Hours | |
| --- | --- | --- | --- |
|  |  | Operating Voltage Drop (mV) | Electrolyte Loss (%) |
| Example 10 | 6 | 50 | 8 |
| Example 11 | 5 | 47 | 6 |

As is apparent from Table 2, the electrolyte bodies having the porous bodies in Examples 10 and 11 have lower macroporosities after the electrolyte bodies are kept in the gas mixture atmosphere for 10,000 hours as compared with the electrolyte bodies of Examples 1 to 9. That is, the porous bodies of Examples 10 and 11 have properties in which when these porous bodies are impregnated with electrolytes consisting of alkali carbonate mixtures in a molten state of 700° C. or less for 10,000 hours, pores having a diameter of 2.0 μm or are formed at a volume ratio of 6% or less. As a result, the molten carbonate fuel cells incorporating these electrolyte bodies have operating voltage drops of 50 mV or less upon operation for 3,000 hours and maintain good performance with small electrolyte losses.

EXAMPLE 12

A filler consisting of 70 g of retaining particles having a particle size of about 0.3 μm and containing 50 wt % of lithium zirconate having a specific surface area of 10 $m^2/g$ and synthesized as in Example 10 and 50 wt % of $LiAlO_2$ having a specific surface area of 10 $m^2/g$, and 30 g of reinforcing particles consisting of $LiAlO_2$ and having a particle size of 20 μm was filled in an alumina pot. The filler was mixed with polyvinyl butyral and dibutyl phthalate in a total amount of 30 g and 100 g of toluene by a wet method for 20 hours to prepare a slurry. The slurry was defoamed and developed into a carrier sheet. The dried green sheet was then degreased to prepare a porous body. This porous body had a porosity of 56% and an average pore size of 0 23 μm.

EXAMPLE 13

Zirconia having a specific surface area of 10 $m^2/g$ and added with 9 mol % of MgO and an $Li_2CO_3$ powder were mixed in equimolar amounts, and the resultant mixture was heat-treated in air at 1,000° C. for 10 hours to synthesize lithium zirconate having the same specific surface area as that of the zirconia added with MgO.

A porous body was manufactured following the same procedures as in Example 12 except that a filler consisting of 70 g of retaining particles having a particle size of about 0.3 μm and containing 50 wt % of MgO-added lithium zirconate having a specific surface area of 10 $m^2/g$ and 50 wt % of $LiAlO_2$ having a specific surface area of 10 $m^2/g$, and 30 g of reinforcing particles consisting of $LiAlO_2$ and having a particle size of 20 μm was used. The porosity and the average pore size of this porous body were almost equal to those of Example 12.

EXAMPLE 14

Zirconia having a specific surface area of 10 $m^2/g$ and added with 3 mol % of $Y_2O_3$ and an $Li_2CO_3$ powder were mixed in equimolar amounts, and the resultant mixture was heat-treated in air at 1,000° C. for 10 hours to synthesize lithium zirconate having the same specific surface area as that of the zirconia added with $Y_2O_3$.

A porous body was manufactured following the same procedures as in Example 12 except that a filler consisting of 70 g of retaining particles having a particle size of about 0.3 μm and containing 50 wt % of $Y_2O_3$-added lithium zirconate having a specific surface 6area of 10 $m^2/g$ and 50 wt % of $LiAlO_2$ having a specific surface area of 10 $m^2/g$, and 30 g of reinforcing particles consisting of $LiAlO_2$ and having a particle size of 20 μm was used. The porosity and the average pore size of this porous body were almost equal to those of Example 12.

EXAMPLE 15

Zirconia having a specific surface area of 10 $m^2/g$ and added with 6 mol % of CaO and an $Li_2CO_3$ powder were mixed in equimolar amounts, and the resultant mixture was heat-treated in air at 1,000° C. for 10 hours to synthesize lithium zirconate having the same specific surface area as that of the zirconia added with CaO.

A porous body was manufactured following the same procedures as in Example 12 except that a filler consisting of 70 g of retaining particles having a particle size of about 0.3 μm and containing 50 wt % of CaO-added lithium zirconate having a specific surface area of 10 $m^2/g$ and 50 wt % of $LiAlO_2$ having a specific surface area of 10 $m^2/g$, and 30 g of reinforcing particles consisting of $LiAlO_2$ and having a particle size of 20 μm was used. The porosity and the average pore size of this porous body were almost equal to those of Example 12.

The porous bodies in Examples 12 to 15 were cut into square pieces each having a size of 4 cm×4 cm, and sheet-like bodies each containing an alkali carbonate mixture (62 mol % of $Li_2CO_3$ and 38 mol % of $K_2CO_3$) as in Examples 1 to 9 were stacked on the pieces, respectively. The stacked structures were heated to 550° C. to melt the sheet-like bodies, thereby obtaining electrolyte bodies impregnated with the alkali carbonate mixtures.

The ratio of pores (macropores) having a diameter of 2.0 μm or more, that is, the macroporosity, of each electrolyte body was measured following the same procedures as in Examples 1 to 9. Results are shown in Table 3.

Each electrolyte body, an anode and a cathode which were made of a nickel-based alloy, a stainless steel separator, an edge seal plate, a perforated plate, and a corrugated plate were used to assemble each molten carbonate fuel cell shown in FIGS. 2 and 3. A cell test was continuously performed for 3,000 hours under the same condition as in Examples 1 to 9. The cell performance and electrolyte loss upon a lapse of 3,000 hours were examined. Results are also summarized in Table 3 below.

TABLE 3

| | Composition of Porous Body | | | | Macroporosity after 10,000 Hours (%) | Cell Characteristics after 3,000 Hours | |
|---|---|---|---|---|---|---|---|
| | Retaining Particles | | | | | | |
| | Lithium Zirconate Upper: Additive Lower: Content | LiAlO$_2$ (wt %) | Content | Content of Reinforcing Particles* | | Operating Voltage Drop (mV) | Electrolyte Loss (%) |
| Example 12 | No additive 50 wt % | 50 | 70 g | 30 g | 19 | 90 | 19 |
| Example 13 | MgO 50 wt % | 50 | 70 g | 30 g | 16 | 65 | 11 |
| Example 14 | Y$_2$O$_3$ 50 wt % | 50 | 70 g | 30 g | 18 | 80 | 7 |
| Example | CaO 50 wt % | 50 | 70 g | 30 g | 17 | 70 | 10 |
| Comparative Example 1 | 0 | 100 | 70 g | 30 g | 25 | 165 | 29 |

*The reinforcing particles consist of LiAlO$_2$.

As is apparent from Table 3, the electrolyte bodies having the porous bodies in Examples 12 to 15 have low macroporosities after the electrolyte bodies are kept in with the electrolyte body of Comparative Example 1. That is, the porous bodies of Examples 12 to 15 have properties in which when these porous bodies are impregnated with electrolytes consisting of alkali carbonate mixtures in a molten state of 700° C. or less for 10,000 hours, pores having a diameter of 2.0 μm or more are formed at a volume ratio of 20% or less. As a result, the molten carbonate fuel cells incorporating these electrolyte bodies have operating voltage drops of 100 mV or less upon operation for 3,000 hours and maintain good performance with small electrolyte losses.

EXAMPLE 16

A filler consisting of 70 g of retaining particles having a particle size of about 0.3 μm and containing 50 wt % of LiAlO$_2$ having a specific surface area of 10 m$^2$/g and 50 wt % of stabilized zirconia added with 9 mol % of MgO and having a specific surface area of 10 m$^2$/g, and 30 g of reinforcing particles consisting of LiAlO$_2$ and having a particle size of 20 μm was filled in an alumina pot. The filler was mixed with polyvinyl butyral and dibutyl phthalate in a total amount of 30 g and 100 g of toluene by a wet method for 20 hours to prepare a slurry. The slurry was defoamed and developed into a carrier sheet. The dried green sheet was then degreased to prepare a porous body. This porous body has a porosity of 53% and an average pore size of 0.21 μm.

EXAMPLE 17

A porous body was manufactured following the same procedures as in Example 16 except that a filler consisting of 70 g of retaining particles having a particle size of about 0.3 μm and containing 50 wt % of LiAlO$_2$ having a specific surface area of 10 m$^2$/g and 50 wt % of stabilized zirconia added with 3 mol % of Y$_2$O$_3$ and having a specific surface area of 10 m$^2$/g, and 30 g of reinforcing particles consisting of LiAlO$_2$ and having a particle size of 20 μm was used. The porosity and the average pore size of this porous body were almost equal to those of Example 16.

EXAMPLE 18

A porous body was manufactured following the same procedures as in Example 16 except that a filler consisting of 70 g of retaining particles having a particle size of about 0.3 μm and containing 50 wt % of LiAlO$_2$ having a specific surface area of 10 m$^2$/g and 50 wt % of partially stabilized zirconia added with 6 mol % of CaO and having an average specific surface area of 10 m$^2$/g, and 30 g of reinforcing particles consisting of LiAlO$_2$ and having a particle size of 20 μm was used. The porosity and the average pore size of this porous body were almost equal to those of Example 16.

The porous bodies in Examples 16 to 18 were cut into square pieces each having a size of 4 cm×4 cm, and sheet-like bodies each containing an alkali carbonate mixture (62 mol % of Li$_2$CO$_3$ and 38 mol % of K$_2$CO$_3$) as in Examples 1 to 9 were stacked on the pieces, respectively. The stacked structures were heated to 550° C. to melt the sheet-like bodies, thereby obtaining electrolyte bodies impregnated with the alkali carbonate mixtures.

The ratio of pores (macropores) having a diameter of 2.0 μm or more, that is, the macroporosity, of each electrolyte body was measured following the same procedures as in Examples 1 to 9. Results are shown in Table 4. Comparative Example 1 is also summarized in Table 4.

Each electrolyte body, an anode and a cathode which were made of a nickel-based alloy, a stainless steel separator, an edge seal plate, a perforated plate, and a corrugated plate were used to assemble each molten carbonate fuel cell shown in FIGS. 2 and 3. A cell test was continuously performed for 3,000 hours under the same condition as in Examples 1 to 9. The cell performance and electrolyte loss upon a lapse of 3,000 hours were examined. Results together with Comparative Example 1 are also summarized in Table 4 below.

TABLE 4

| | Composition of Porous Body | | | | Macroporosity after 10,000 Hours (%) | Cell Characteristics after 3,000 Hours | |
|---|---|---|---|---|---|---|---|
| | Retaining Particles | | | | | | |
| | Zirconia Upper: Additive Lower: Content | LiAlO$_2$ (wt %) | Content | Content of Reinforcing Particles* | | Operating Voltage Drop (mV) | Electrolyte Loss (%) |
| Example 16 | MgO 50 wt % | 50 | 70 g | 30 g | 15 | 60 | 11 |
| Example 17 | Y$_2$O$_3$ 50 wt % | 50 | 70 g | 30 g | 17 | 85 | 13 |

TABLE 4-continued

| | Composition of Porous Body | | | | Macroporosity after 10,000 Hours (%) | Cell Characteristics after 3,000 Hours | |
|---|---|---|---|---|---|---|---|
| | Retaining Particles | | | | | | |
| | Zirconia Upper: Additive Lower: Content | $LiAlO_2$ (wt %) | Content | Content of Reinforcing Particles* | | Operating Voltage Drop (mV) | Electrolyte Loss (%) |
| Example 18 | CaO 50 wt % | 50 | 70 g | 30 g | 17 | 70 | 13 |
| Comparative Example 1 | 0 | 100 | 70 g | 30 g | 25 | 165 | 29 |

*The reinforcing particles consist of $LiAlO_2$.

As is apparent from Table 4, the electrolyte bodies having the porous bodies in Examples 16 to 18 have low macroporosities after the electrolyte bodies are kept in the gas mixture atmosphere for 10,000 hours as compared with the electrolyte body of Comparative Example 1. That is, the porous bodies of Examples 16 to 18 have properties in which when these porous bodies are impregnated with electrolytes consisting of alkali carbonate mixtures in a molten state of 700° C. or less for 10,000 hours, pores having a diameter of 2.0 μm or more are formed at a volume ratio of 20% or less. As a result, the molten carbonate fuel cells incorporating these electrolyte bodies have operating voltage drops of 100 mV or less upon operation for 3,000 hours and maintain good performance with small electrolyte losses.

EXAMPLE 19

A filler of a composition having 70 g of retaining particles consisting of a mixture of 1.0 wt % of $LiAl_5O_8$ and the balance of $\gamma$-$LiAlO_2$ and having a specific surface area of 8 m$^2$/g and a particle size of about 0.3 μm and 30 g of reinforcing particles consisting of $\gamma$-$LiAlO_2$ having a particle size of 20 μm was placed in an alumina pot, and polyvinyl butyral and dibutyl phthalate in a total amount of 30 g, 100 g of toluene, and the filler were mixed by a wet method for 20 hours to prepare a slurry. The slurry was defoamed and developed into a carrier sheet. The dried green sheet was degreased to obtain a porous body. This porous body had a porosity of 50% and an average pore size of 0.25 μm.

EXAMPLE 20

A porous body was manufactured following the same procedures as in Example 19 except that a filler of a composition having 70 g of retaining particles consisting of a mixture of 3.0 wt % of $LiAl_5O_8$ and the balance of $\gamma$-$LiAlO_2$ and having a specific surface area of 10 m$^2$/g and a particle size of about 0.3 μm, and 30 g of reinforcing particles consisting of $\gamma$-$LiAlO_2$ having a particle size of 20 μm was used. This porous body had a porosity of 53% and an average pore size of 0.23 μm.

EXAMPLE 21

A porous body was manufactured following the same procedures as in Example 19 except that a filler of a composition having 70 g of retaining particles having a particle size of about 0.3 μm and consisting 50 wt % of lithium zirconate added with 9 mol % of MgO and having a specific surface area 10 m$^2$/g and 50 wt % of $LiAlO_2$ having a specific surface area of 10 m$^2$/g, and 30 g of reinforcing particles consisting of $LiAlO_2$ having an average particle size of 20 μm was used. This porous body had a porosity of 54% and an average pore size of 0.24 μm.

EXAMPLE 22

A porous body was manufactured following the same procedures as in Example 19 except that a filler of a composition having 70 g of retaining particles having a particle size of about 0.3 μm and consisting 50 wt % of lithium zirconate added with 3 mol % of $Y_2O_3$ and having a specific surface area 10 m$^2$/g and 50 wt % of $LiAlO_2$ having a specific surface area of 10 m$^2$/g, and 30 g of reinforcing particles consisting of $LiAlO_2$ having a particle size of 20 μm was used. This porous body had a porosity of 54% and a pore size of 0.25 μm.

EXAMPLE 23

A porous body was manufactured following the same procedures as in Example 19 except that a filler of a composition having 70 g of retaining particles having a particle size of about 0.3 μm and consisting 50 wt % of stabilized zirconia added with 9 mol % of MgO and having a specific surface area 10 m$^2$/g and 50 wt % of $LiAlO_2$ having a specific surface area of 10 m$^2$/g, and 30 g of reinforcing particles consisting of $LiAlO_2$ having a particle size of 20 μm was used. This porous body had a porosity of 55% and an average pore size of 0.23 μm.

EXAMPLE 24

A porous body was manufactured following the same procedures as in Example 19 except that a filler of a composition having 70 g of retaining particles having a particle size of about 0.3 μm and consisting 50 wt % of stabilized zirconia added with 3 mol % of $Y_2O_3$ and having a specific surface area 10 m$^2$/g and 50 wt % of $LiAlO_2$ having a specific surface area of 10 m$^2$/g, and 30 g of reinforcing particles consisting of $LiAlO_2$ having a particle size of 20 μm was used. This porous body had a porosity of 54% and an average pore size of 0.25 μm.

The porous bodies in Examples 19 to 24 were cut into square pieces each having a size of 4 cm×4 cm, and sheet-like bodies containing alkali carbonate mixtures (62 mol % of $Li_2CO_3$ and 38 mol % of $K_2CO_3$) added with alkali earth compounds of the types and amounts listed in Table 5 were stacked on the pieces, respectively. The stacked structures were heated to 550° C. to melt the sheet-like bodies, thereby obtaining electrolyte bodies impregnated with the alkali carbonate mixtures and the alkali earth compounds.

The ratio of pores (macropores) having a diameter of 2.0 μm or more, that is, the macroporosity, of each electrolyte body was measured following the same procedures as in Examples 1 to 9. Results are shown in Table 5.

Each electrolyte body, an anode and a cathode which were made of a nickel-based alloy, a stainless steel separator, an edge seal plate, a perforated plate, and a corrugated plate were used to assemble each molten carbonate fuel cell shown in FIGS. 2 and 3. A cell test was continuously performed for 3,000 hours under the same condition as in Examples 1 to 9. The cell performance and electrolyte loss upon a lapse of 3,000 hours were examined. Results are also summarized in Table 5 below.

zirconia added with 9 mol % of MgO and having a particle size of about 0.1 μm, and 30 g of reinforcing particles consisting of stabilized zirconia added with 3 mol % of $Y_2O_3$ and having a particle size of 20 μm was used. The porosity and the average pore size of this

TABLE 5

| | Composition of Porous Body | | | Content of Alkali Earth Compound | Macroporosity after 10,000 Hours (%) | Cell Characteristic after 3,000 Hours | |
|---|---|---|---|---|---|---|---|
| | Retaining Particles | | Content of Reinforcing Particles* | | | Operating Voltage Drop (mV) | Electrolyte Loss (%) |
| | type | Content | | | | | |
| Example 19 | γ-$LiAlO_2$ containing 1 wt % of $LiAl_5O_8$ | 70 g | 30 g | $CaCO_3$ (5 mol %) | 15 | 53 | 10 |
| Example 20 | γ-$LiAlO_2$ containing 1 wt % of $LiAl_5O_8$ | 70 g | 30 g | MgO (5 mol %) | 12 | 42 | 9 |
| Example 21 | MgO-Added $Li_2ZrO_3$: 50 wt % $LiAlO_2$: 50 wt % | 70 g | 30 g | $CaCO_3$ (5 mol %) | 15 | 45 | 12 |
| Example 22 | $Y_2O_3$-Added $Li_2ZrO_3$: 50 wt % $LiAlO_2$: 50 wt % | 70 g | 30 g | MgO (5 mol %) | 17 | 65 | 18 |
| Example 23 | $Y_2O_3$-Added $ZrO_2$: 50 wt % $LiAlO_2$: 50 wt % | 70 g | 30 g | MgO (5 mol %) | 17 | 65 | 17 |

*The reinforcing particles consist of $LiAlO_2$.

As is apparent from Table 5, the electrolyte bodies having the porous bodies in Examples 19 to 24 have low macroporosities after the electrolyte bodies are kept in the gas mixture atmosphere for 10,000 hours. That is, the porous bodies of Examples 19 to 24 have properties in which when these porous bodies are impregnated with electrolytes consisting of alkali carbonate mixtures in a molten state of 700° C. or less for 10,000 hours, pores having a diameter of 2.0 μm or more are formed at a volume ratio of 20% or less. As a result, the molten carbonate fuel cells incorporating these electrolyte bodies have operating voltage drops of 100 mV or less upon operation for 3,000 hours and maintain good performance with small electrolyte losses.

EXAMPLE 25

A filler of a composition having 70 g of retaining particles consisting of $LiAlO_2$ having a specific surface area of 10 m²/g and a particle size of about 0.3 μm, and 30 g of reinforcing particles consisting of stabilized zirconia added with 9 mol % of MgO and having a particle size of 20 μm was placed in an alumina pot, and polyvinyl butyral and dibutyl phthalate in a total amount of 30 g, 100 g of toluene, and the filler were mixed by a wet method for 20 hours to prepare a slurry. The slurry was defoamed and developed into a carrier sheet. The dried green sheet was degreased to obtain a porous body. This porous body had a porosity of 56% and an average pore size of 0.23 μm.

EXAMPLE 26

A porous body was manufactured following the same procedures as in Example 25 except for a filler of a composition having retaining particles consisting of 35 g of $LiAlO_2$ having a specific surface area of 10 m²/g and a particle size of about 0.3 μm and 35 g of stabilized porous body were almost equal to those of Example 25.

EXAMPLE 27

A porous body was manufactured following the same procedures as in Example 25 except for a filler of a composition having 70 g of retaining particles consisting of $LiAlO_2$ having a specific surface area of 10 m²/g and a particle size of about 0.3 μm, and 30 g of reinforcing particles consisting of $Li_2ZrO_3$ having a particle size of 20 μm was used. The porosity and the average pore size of this porous body were almost equal to those of Example 25.

The porous bodies in Examples 25 to 27 were cut into square pieces each having a size of 4 cm×4 cm, and sheet-like bodies each containing an alkali carbonate mixture (62 mol % of $Li_2CO_3$ and 38 mol % of $K_2CO_3$) as in Examples 1 to 9 were stacked on the pieces, respectively. The stacked structures were heated to 550° C. to melt the sheet-like bodies, thereby obtaining electrolyte bodies impregnated with the alkali carbonate mixtures.

The ratio of pores (macropores) having a diameter of 2.0 μm or more, that is, the macroporosity, of each electrolyte body was measured following the same procedures as in Examples 1 to 9. Results are shown in Table 6.

Each electrolyte body, an anode and a cathode which were made of a nickel-based alloy, a stainless steel separator, an edge seal plate, a perforated plate, and a corrugated plate were used to assemble each molten carbonate fuel cell shown in FIGS. 2 and 3. A cell test was continuously performed for 3,000 hours under the same condition as in Examples 1 to 9. The cell performance and electrolyte loss upon a lapse of 3,000 hours were examined. Results together with Comparative Example 1 are also summarized in Table 6 below.

TABLE 6

| | Composition of Porous Body | | Macroporosity after 10,000 Hours (%) | Cell Characteristics after 3,000 Hours | |
|---|---|---|---|---|---|
| | Retaining Particles Values in Parentheses Indicate Contents | Reinforcing Particles Values in Parentheses Indicate Contents | | Operating Voltage Drop (mV) | Electrolyte Loss (%) |
| Example 25 | LiAlO$_2$ (70 g) | Stabilized ZrO$_2$ (30 g) | 16 | 65 | 14 |
| Example 26 | LiAlO$_2$ Stabilized ZrO$_2$ (70 g) | LiAlO$_2$ (30 g) | 15 | 40 | 11 |
| Example 27 | LiAlO$_2$ (70 g) | Li$_2$ZrO$_3$ (30 g) | 16 | 80 | 15 |
| Comparative Example 1 | LiAlO$_2$ (70 g) | LiAlO$_2$ (30 g) | 25 | 165 | 29 |

As is apparent from Table 6, the electrolyte bodies having the porous bodies in Examples 25 to 27 have low macroporosities after the electrolyte bodies are kept in the gas mixture atmosphere for 10,000 hours as compared with the electrolyte body of Comparative Example 1. That is, the porous bodies of Examples 25 to 27 have properties in which when these porous bodies are impregnated with electrolytes consisting of alkali carbonate mixtures in a molten state of 700° C. or less for 10,000 hours, pores having a diameter of 2.0 μm or more are formed at a volume ratio of 20% or less. As a result, the molten carbonate fuel cells incorporating these electrolyte bodies have operating voltage drops of 100 mV or less upon operation for 3,000 hours and maintain good performance with small electrolyte losses.

The electrolyte bodies having the porous bodies of Examples 1 to 27 were used to assemble molten carbonate fuel cells shown in FIGS. 2 and 3, and continuous power generation was performed for 3,000 hours under the same conditions as in Examples 1 to 9. A thermal cycle was performed once every 500 hours during cell test, and the N$_2$ content at the anode outlet was analyzed by gas chromatography, thereby checking the presence/absence of cracks. No cracks occurred in all fuel cells because the content of retaining particles falls within the range of 50 to 90 wt % and that of reinforcing particles falls within the range of 10 to 50 wt % to constitute each porous body.

As has been described above, according to the present invention, there is provided a long-life molten carbonate fuel cell which can suppress an increase in internal resistance and generation of a gas crossover which are caused by outflow of an electrolyte.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A molten carbonate fuel cell comprising:
   a pair of conductive electrodes;
   an electrolyte body sandwiched between the pair of electrodes and constituted by a porous body and an electrolyte comprising an alkali carbonate mixture impregnated in said porous body, said porous body containing a filler consisting essentially of a first group of particles having a particle size of not more than 1 μm and a function of retaining said electrolyte, and second group of particles having a particle size of 5 to 100 μm and a function of reinforcing said porous body, the particles of said first group and the particles of said second group being made of at least one material selected from the group consisting of LiAl$_x$O$_y$ (4.5≦x≦5.5 and 7.25≦y≦8.75), LiAl$_a$O$_b$ (0.89≦a≦1.11 and 1.80≦b≦2.20) lithium zirconate and stabilized zirconia, but being different in material from each other;
   fuel gas supplying means for supplying a fuel gas to one of the pair of electrodes; and
   oxidant gas supplying means for supplying an oxidant gas to the other of the pair of electrodes.

2. A cell according to claim 1, wherein the particles having the function of retaining the electrolyte have a particle size falling within a range of 0.05 to 0.5 μm.

3. A cell according to claim 1, wherein the particles having the function of reinforcing the porous body have a particle size falling within a range of 10 to 60 μm.

4. A cell according to claim 1, wherein the particles having the function of retaining the electrolyte comprise at least one material selected from the group consisting of LiAl$_x$O$_y$ (x and y are defined as in claim 1), LiAl$_a$O$_b$ (a and b are defined as in claim 1), lithium zirconate, and stabilized zirconia, and the particles having the function of reinforcing the porous body comprises at least one material selected from the group consisting of LiAl$_x$O$_y$ (x and y are defined as in claim 1), lithium zirconate, and stabilized zirconia.

5. A cell according to claim 1, wherein the particles having the function of retaining the electrolyte consist of a mixture of LiAl$_x$O$_y$ (x and y are defined as in claim 1) and LiAl$_a$O$_b$ (a and b are defined as in claim 1).

6. A cell according to claim 1, wherein the particles having the function of retaining the electrolyte consist of lithium zirconate.

7. A cell according to claim 1, wherein the particles having the function of retaining the electrolyte consist of a mixture of lithium zirconate and LiAl$_a$O$_b$ (a and b are defined as in claim 1).

8. A cell according to claim 7, wherein the particles having the function of retaining the electrolyte contain 30 to 70 wt % of the lithium zirconate.

9. A cell according to claim 1, wherein the particles having the function of retaining the electrolyte consist of a mixture of LiAl$_x$O$_y$ (x and y are defined as in claim 1), LiAl$_a$O$_b$ (a and b are defined as in claim 1), and lithium zirconate.

10. A cell according to claim 1, wherein the particles having the function of retaining the electrolyte consist of a mixture of LiAl$_x$O$_y$ (x and y are defined as in claim 1), LiAl$_a$O$_b$ (a and b are defined as in claim 1), and stabilized zirconia.

11. A cell according to claim 1, wherein the particles having the function of reinforcing the porous body consist of $LiAl_aO_b$ (a and b are defined as in claim 1).

12. A cell according to claim 1, wherein the filler essentially consists of particles made of particles having a function of retaining the electrolyte and consisting of a mixture of $LiAl_xO_y$ (x and y are defined as in claim 1), $LiAl_aO_b$ (a and b are defined as in claim 1), and MgO-stabilized zirconia, and particles having a function of reinforcing the porous body and consisting of $LiAl_aO_b$ (a and b are defined as in claim 1).

13. A cell according to claim 1, wherein the filler essentially consists of 50 to 90 wt % of the particles having the function of retaining the electrolyte and 10 to 50 wt % of the particles having the function of reinforcing the porous body.

14. A cell according to claim 1, wherein the porous body has a porosity of 40 to 65%.

15. A cell according to claim 1, wherein when the porous body is impregnated with the electrolyte in a molten state of not more than 700° C. for 10,000 hours, the porous body has pores having a diameter of not less than 2.0 μm at a volume ratio of not more than 20%.

* * * * *